Feb. 6, 1945.  R. R. HAYS  2,369,049
ROTARY WING AIRCRAFT
Filed Sept. 28, 1943  3 Sheets-Sheet 1
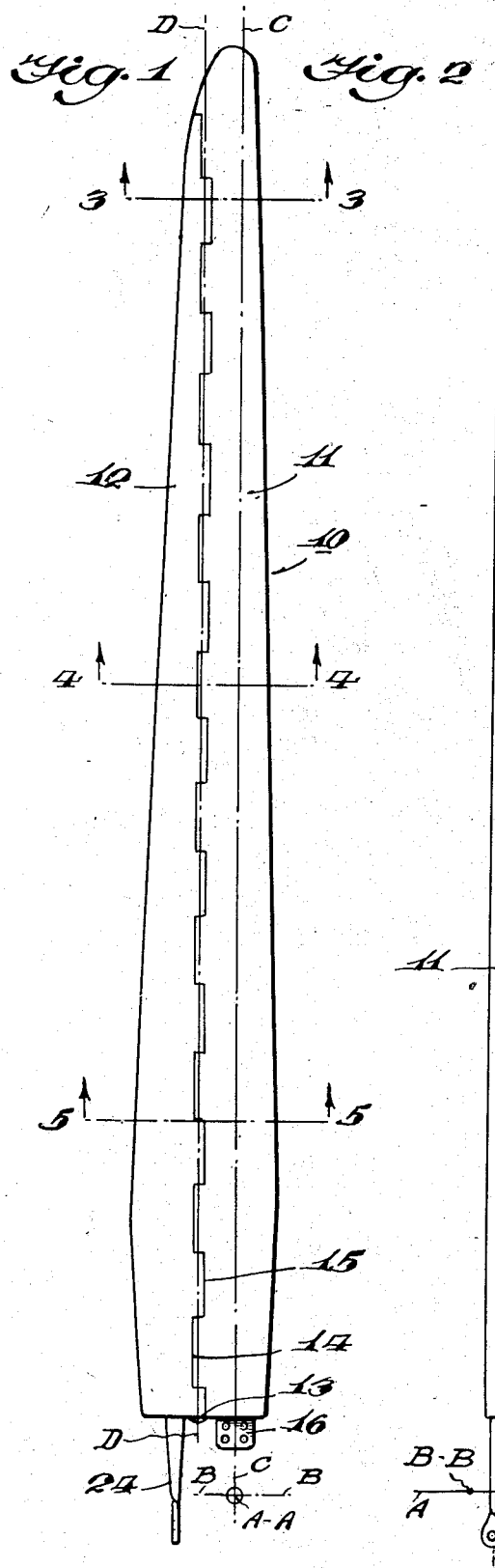
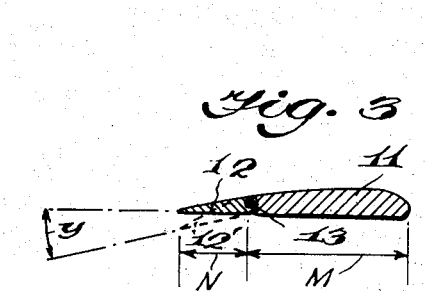
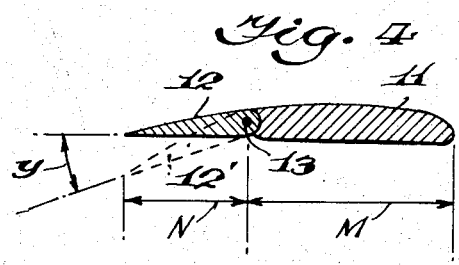
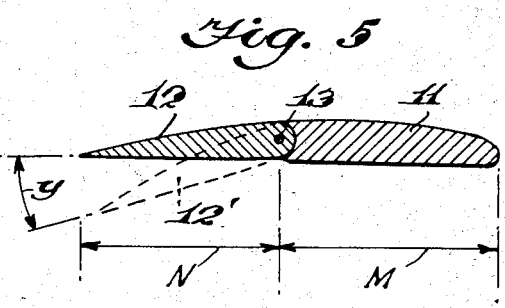
Inventor
Russell R. Hays,
By
Attorney Feb. 6, 1945. R. R. HAYS 2,369,049
ROTARY WING AIRCRAFT
Filed Sept. 28, 1943 3 Sheets-Sheet 2
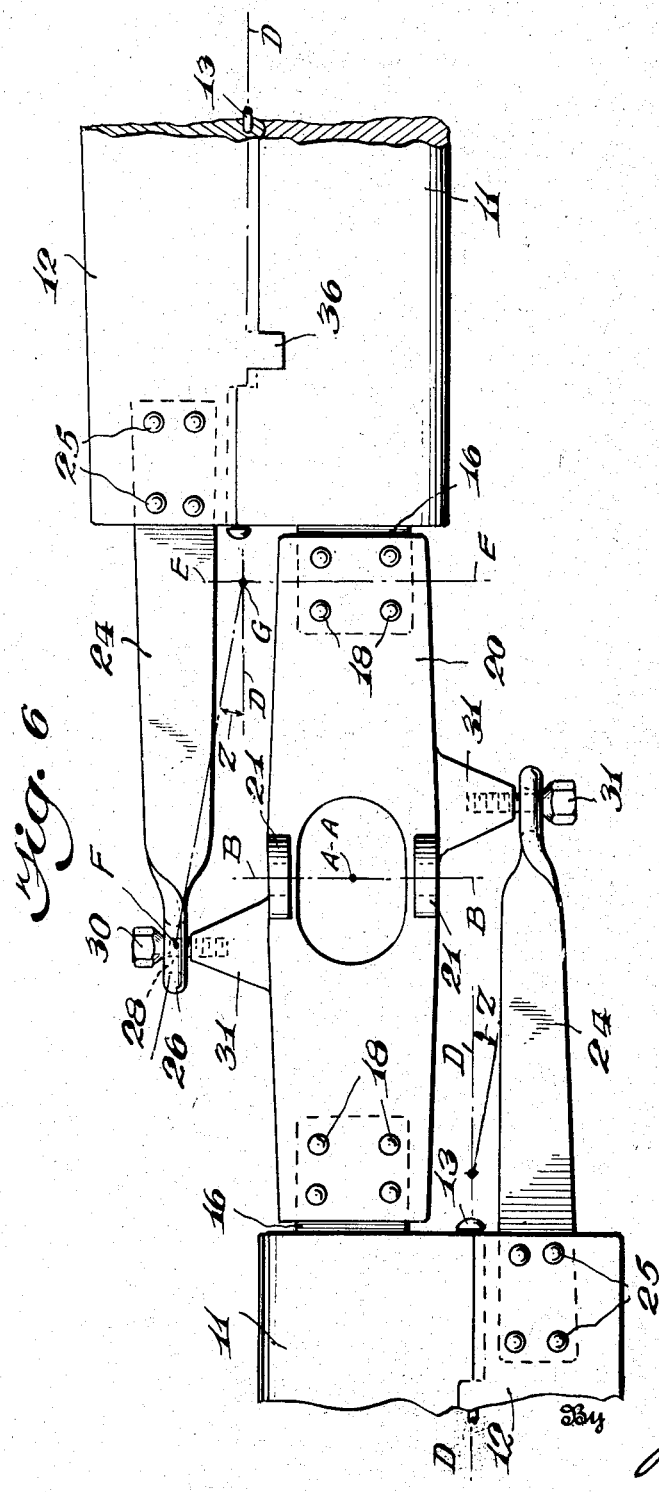
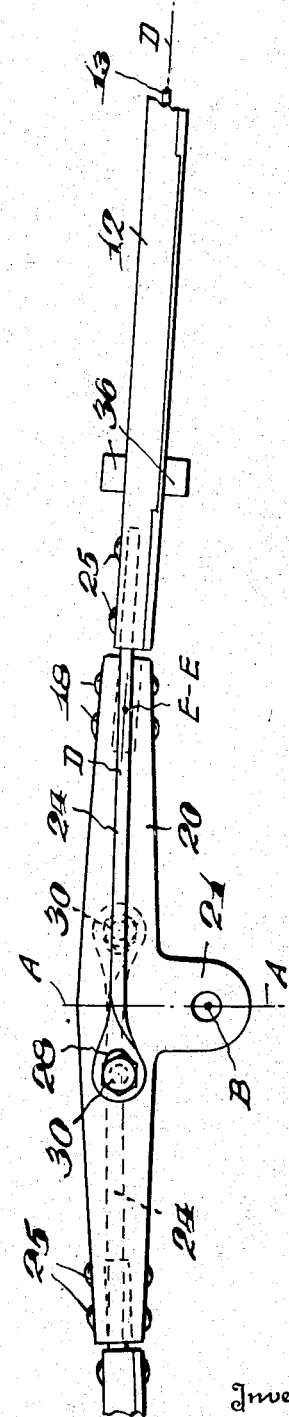
Inventor
Russell R. Hays,
Attorney Feb. 6, 1945.   R. R. HAYS   2,369,049
ROTARY WING AIRCRAFT
Filed Sept. 28, 1943   3 Sheets-Sheet 3
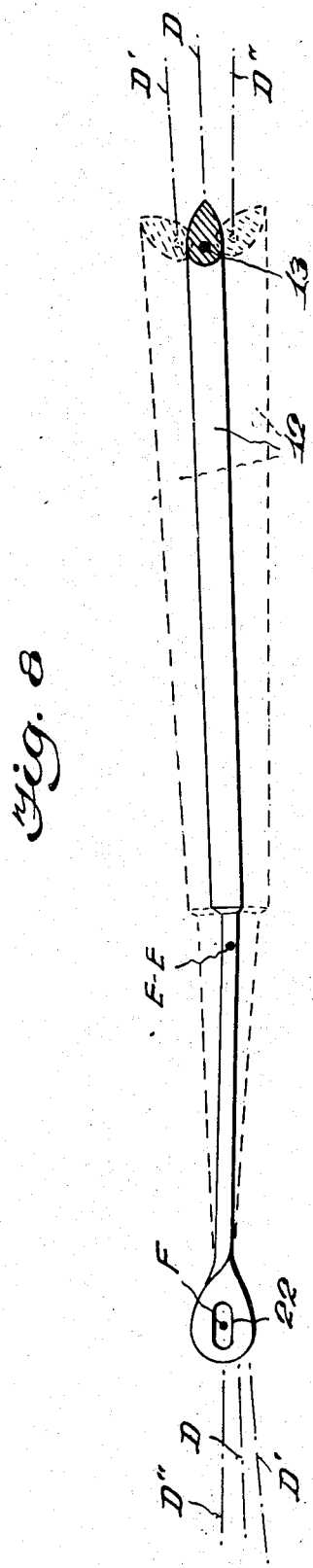
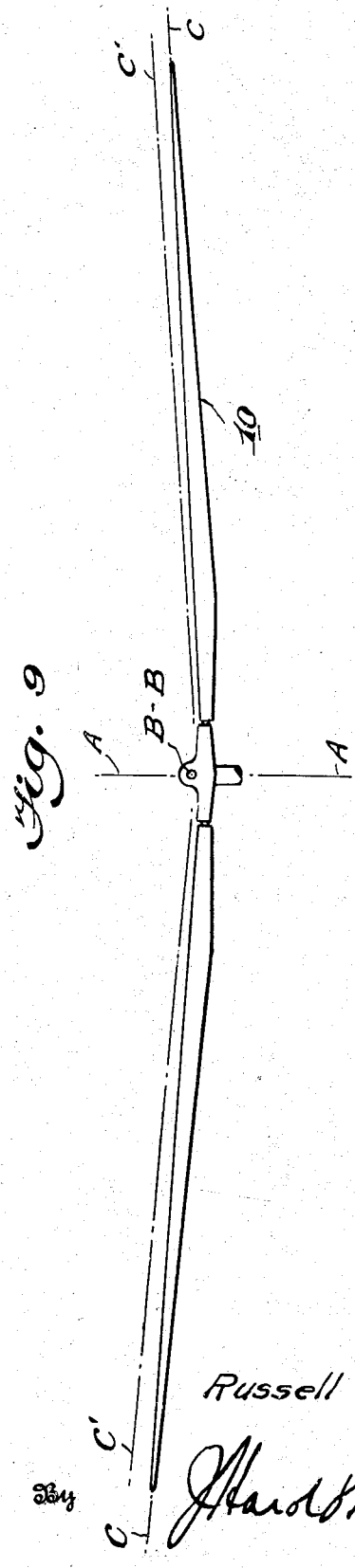
Inventor
Russell R. Hays,
By
Attorney Patented Feb. 6, 1945

2,369,049

UNITED STATES PATENT OFFICE 2,369,049

ROTARY WING AIRCRAFT

Russell R. Hays, Lawrence, Kans.

Application September 28, 1943, Serial No. 504,143

5 Claims. (Cl. 170—164)

This invention relates to improvements in rotary wing aircraft, and more particularly to a lifting propeller having flaps mounted on the trailing edge of the blades thereof, movement of which effects a variation in the flight characteristics of the propeller as a whole.

Among the problems encountered in the design of a lifting propeller is one of converting a propeller to an effective autorotating blade system in the event of engine failure. Free-wheeling devices which permit continued rotation of a propeller after failure of the engine are well known, as are various mechanisms which automatically decrease the pitch of the system in order to convert it to an autorotative system.

The problem of efficient flight in conjunction with the safety factor inherent to autorotative descent in event of engine failure is not, however, disposed of by such expedients, because, although the lifting propeller and the autorotative rotor belong to the same family and as such exhibit marked similarity as regards optimum efficiency with respect to tipspeed ratios, solidity, span, and the like, a very definite distinction exists in respect to the optimum twist and operating pitch of the blades. This difference arises through the fact that the lifting propeller is tilted forward slightly with respect to its direction of travel in order to obtain a propulsive component through forward tilting of the resultant force effective upon the propeller; whereas the autorotative rotor is tilted slightly rearwardly to its direction of travel in order that a portion of the airstream resultant to this travel will actuate the inner sections of the rotor blades so that in effect they constitute a windmill capable of turning the outer sections of the same blades which then function as lifting propellers. Basically, this means that the airstream resultant to translation must pass up through the center of an autorotative system, whereas with a lifting propeler it must pass downward through this same portion of the disc area.

Since the induced flow is relatively constant across the span of either a propeller or a rotor, whereas the rotational velocity of the blade sections varies directly as their distance from the hub, it follows that with optimum efficiency dependent upon the use of comparatively low attack angles to the airstream passing through the system's disc, the pitch of the lifting propeller will be characterized by twist of the blades which is greatest at the hub. With the autorotative system, on the other hand, windmilling will be possible only when the resultant force on the individual blade sections has a forward component relative to the axis of rotation, and hence to convert the lifting propeller to an autorotative system, its twist must be reversed or otherwise nullified.

It is thus apparent that such conversion should incorporate not only provision for a decrease in the effective pitch of the system, but also for effecting a reverse twisting of the blades. Automatically changing the pitch of a lifting propeller in event of engine failure is comparatively easy of attainment as is well known in the art. Automatically varying the twist of the blades at the same time, however, although variously suggested heretofore, as yet appears to be impractical in the form proposed.

Difficulty in the latter respect arises from two sources. For the blades simply to be twisted about their span axes implies a certain degree of flexibility in the blades as well as involved mechanical linkages whose parts are subject to fatigue and which are not readily amenable to production methods. The use of flaps, on the other hand, resolves itself essentially to a variation in the air foil section initially used. This may be considered as a camber variation, since chord and thickness do not vary greatly. Camber variation in turn is associated with center of pressure travel which so varies the stability of some blade sections as to introduce exceedingly involved structural problems.

Tests earlier conducted with tension loaded flaps as a feathering means indicated that one of the greatest difficulties encountered arose through lag of the restoring moment after an aerodynamic load had been removed. In short, the flaps kicked up to low angle-of-attack positions and tended to maintain this position despite a decrease in the R. P. M. far below that at which they had initially kicked up. Subsequently, a large number of airfoil sections were tested on rotors in an effort to determine to what degree their characteristics were reflected in rotor performance. The results of these tests indicated that the characteristics of the medium camber sections were not altered too greatly through the use of flaps, but that as the width of the flap is increased a very poor autorotative section finally evolves.

It was observed, however, that the performance of such a section decreased at the higher rotational velocities; i. e. at lower values of the tipspeed ratio, but that it was not so much out of line at low rotational speeds. The indication was thus given that at the inner portion of the blades, such sections might be used without incurring a prohibitive loss in efficiency. This finding was of particular value since it points to the use of large flaps to provide large pitch variations at the inner part of a rotor. It therefore follows that a single continuous flap of triangular form may be used in conjunction with a leading edge portion of substantially constant width to form an efficient autorotative blade; and that by movement of the flap from a position in which the two parts provide optimum autorotative sections at all points along the span, not only is the effective pitch of the blade increased, but also an effective twist suited for a lifting propeller results.

Since rotation of the blade about its span axis to attain pitch variation is no longer necessary when such flaps are used, it now becomes possible to achieve gradual movement of the flaps automatically to an autorotative position in event of engine failure. Previous methods employed to effect the requisite pitch variation had been of two general types. One utilized springs which were mechanically released when the rotor freewheeled. The other utilized movement of the blade relative to a radial line in its plane of rotation, which occurred when a drive torque ceased to be applied. Both methods are objectionable in that each responds directly to an abrupt transition from power-on and power-off conditions of flight which does not take into account the direction of the relative airstream still effective upon the system by reason of the inertia of its forward motion. Thus, with the propeller tilted forward in translational flight, an abrupt change in pitch actually reverses the direction of action of the resultant force, a reversal which in close proximity to the earth might easily prove to be disastrous.

For this reason, a more gradual means of pitch variation with the change from power-on to power-off conditions of flight is desirable. And one logical source for activating this change is present in the characteristic of self-aligning blades in effecting an increase in the coning angle of the blades with transition of a lifting propeller to an autorotative system, as will now be discussed.

In normal cruising flight, failure of the engine is not immediately evidenced by a change in flight due to the rotational inertia of the blades and the forward inertia of the machine acting to perpetuate the initial state of flight. However, as this inertia is dissipated, not only does the forward speed of the machine decrease but the rotational speed of the propeller also decreases. With decrease in rotational speed the lift of the propeller decreases and the machine starts to descend. As the speed of descent increases, the direction of the airstream passing through the propeller is reversed; that is, it strikes the propeller from below rather than from above, and thus acts to increase the attack angle of the blades. At the same time the vertical component of the centrifugal force effective upon the blades has decreased by reason of their decreased rotational velocity. Consequently, the lift of the blades now acts to raise them, i. e. cone them upwardly, to a new position in which lift and centrifugal force effective upon them are in equilibrium.

Were the pitch of the propeller maintained constant during such increased coning, the propeller would eventually stop. If, however, such increased coning acts to decrease the pitch of the blades, then a gradual transition of a lifting propeller to an autorotative system can be obtained. This type of transition is particularly advantageous when used in conjunction with a propeller having interconnected blades mounted for free rocking action about an axis transverse to their axis of rotation and at right angles to the span axis of the blades. The reason therefor is that with individually articulated blades in which coning variation varies their pitch, tilting of the rotor produces a pitch increase on the downwardly flapping blade and a pitch decrease on the upwardly flapping blade. While this may be advantageous for feathering, it has been found that when blades individually vary their pitch with tilting or flapping by a degree sufficient to effectively convert them from lifting propellers to autorotative blades with small changes in their coning angles, rotor tilt feathers them excessively with the result that they become exceedingly rough and highly inefficient. For this reason, a practical means for converting a propeller having individually articulatively mounted blades to an autorotative system through increased coning of the blades has not and cannot be achieved.

Accordingly, with these considerations in mind, the object of this invention is broadly the provision of a lifting propeller, the blades of which incorporate trailing edge flaps which are automatically operative in event of engine failure to convert the propeller to an efficient autorotative blade system.

A further object is the provision in a lifting propeller of a trailing edge flap for the blades of the propeller which is wider at its inner end than at its outer end so that the ratio between its area and that of the blade proper is greater at the inner sections of the blade than at the outer sections, with the result that movement of the flap is effected to produce a greater change in the effective pitch of the inner blade sections than the outer blade sections.

Another object is the provision of a novel rotor blade in which the weight and strength of the blade is centered in a leading edge portion of substantially uniform width and to which is hingedly mounted a triangular shaped flap of relatively light construction which has its greatest width adjacent the hub of the blade and its least width adjacent the tip of the blade.

A still further object is the provision of a lifting propeller whose blades are provided with trailing edge flaps of the stated character and which incorporates means operative upon increase of the coning angle of the blades in response to a transition from power-on to power-off conditions of flight to gradually raise the flaps with increase of coning to effect smooth conversion of the propeller to an autorotative blade system.

Yet another object is the provision in a lifting propeller of blades having trailing edge flaps of the character described, and means operative upon variation in the coning angles of the blades to raise the flaps with upward coning action thereof and to lower them with downward coning action.

Another object is the provision of yieldable means for varying the effective pitch of a propeller blade with coning, the yield point of which is greater than required to vary the pitch through a normal range, but which when the blade movement is arrested by appropriate means is then yieldable to prevent distortion of the mechanism.

Still another object is the provision of a propeller whose blades are inter-connected by means of a drop center hub mounted for relative rocking movement about an axis transverse to their axis of rotation, and are provided with flaps suitable for imposing the equivalent of twist and pitch variation simultaneously, together with yieldable means operative between the blades proper and their flaps to automatically vary the pitch of the blades coincident with flexing of the blades to increase their coning angle.

Ancillary objects of the invention will become apparent from the following description taken with the accompanying drawings, in which—

Fig. 1 is a plan view of a lifting propeller blade according to the invention, illustrating the leading edge portion of substantially uniform width and a trailing edge flap of triangular shape;

Fig. 2 is a side elevation of the blade shown in Fig. 1, looking into the leading edge thereof;

Figs. 3, 4 and 5 are, respectively, enlarged sectional views taken along lines 3—3, 4—4 and 5—5 of the blade shown in Fig. 1;

Fig. 6 is an enlarged plan view of the hub or inner part of a lifting propeller, the interconnected blades of which each incorporate a trailing edge flap according to the invention, illustrating the mounting of the interconnected blades in the hub and the offset yieldable arm which controls the degree of trailing flap movement in response to coning of the blades;

Fig. 7 is a side elevation of the blade and flap mounting illustrated in Fig. 6;

Fig. 8 is an enlarged view of the flap mechanism taken in side elevation, illustrating the angular change of the flap accompanying variation in the blade coning angle;

Fig. 9 is a diagrammatic view in side elevation of a drop center propeller, illustrating the increase of the coning angles of the blades with transition to an autorotative condition.

In the drawings, wherein like reference characters designate like parts throughout the several views, reference character 10 (Figs. 1 and 2) indicates a lifting propeller blade of more or less conventional plan form designed around a medium camber wing section such as the N. A. C. A. 2412 and which, according to the invention, has a leading edge portion 11 in which the weight and strength of the blades is centered and a trailing edge portion or flap 12 of relatively light construction hingedly connected thereto by an elongated hinge pin 13 carried by the dove-tailed hinge leafs or trunnions 14, 15, provided, respectively, on the adjacent edges of such leading and trailing edge portions. As will be observed in Fig. 1, the leading edge portion 11 has substantially uniform width throughout its length whereas the flap 12 is of generally triangular plan form, having its greatest width adjacent the butt of the blade and its least width adjacent the blade tip. As shown, the chord lines of the leading edge portion 11 and flap 12 are in alignment, and the cross sections of the blades as seen in Figs. 3, 4 and 5 are of conventional airfoil sections having the same pitch relative to their plane of rotation. However, due to its triangular plan form, movement of the flap about the hinge axis 13 effects simultaneously a twist variation in the blade and a variation of its camber by a greater amount at its butt than at its tip, and hence produces a corresponding variation in the effective pitch of the blade. Thus, assuming upward movement of the flap the blade is effectively untwisted (flattened) and its pitch decreased, whereas downward movement of the flap increases the twist of the blade and hence its pitch. As respects camber variation, it will be seen that at section 3—3 (Fig. 3), the chord N of the flap is approximately 30% of the total chord N—M of the blade section; at second 4—4 (Fig. 4) the flap chord N is approximately 40% of the total chord; while at section 5—5 it approaches 50% of the total chord. Accordingly, the ratio of blade area to that of the blade proper is greater at the inner sections of the blade than at the outer sections thereof. While these values for the width of the flap are probably greater than will be used in most designs contemplated, they nevertheless show clearly the variation of the chamber of the blade by a greater amount at its butt than at its tip, resultant to movement of the flap through a lowering angle $y$ to a position 12' at those sections along the span of the blade at which the flap 12 has greater width.

It will be further observed that movement of the flap 12 relative to the leading edge portion 11 of the blade does not greatly alter the general characteristics of the section adjacent the tip edge of the blade on which the section 3—3 is taken, and that the change which does occur as a result of flap movement is essentially one of twisting or untwisting (flattening out) of the blades and of increasing the camber of the blade sections as well as of moving the position of maximum camber rearwardly by a relatively small degree. It has been found that such movement does not introduce roughness into the operation of a rotor because, although a less satisfactory section results with increase in the degree of camber variation and travel of maximum camber rearwardly with increasing flap area, it will be noted that the less satisfactory sections are confined to the inner portions of the blade where the air loads are comparatively light.

Considering now the means for raising and lowering the flaps, reference is made to Figs. 6, 7 and 9, wherein symmetrically disposed blades provided with flaps as aforesaid are shown as interconnected by a drop center hub 20 which is preferably of the type disclosed and claimed in my copending application Serial No. 494,705, filed July 14, 1943. With the leading edge portion of each blade having a blade butt 16 solidly affixed to it, the butts in turn are yieldably mounted on bolts 18 carried by the hub. The hub 20 is mounted for free rocking movement about an axis B—B through the bearings or hangers 21 which is transverse to the axis of rotation A—A of a drive shaft (not shown). Inasmuch as the means for actuating the flaps of the symmetrically disposed blades are identical, one such means only will be described.

The blade flap 12 at its relatively inner end carries a yieldable arm member 24 of spring steel or other suitable material, the strip being fixed to the flap by means of rivets 25. As indicated in Figs. 6 and 7, the strap 24 is twisted at its relatively inner end to form a hanger 26 which is provided with an elongated, vertically disposed slot or eye 28 for a bolt 30 threaded into an extension 31 which projects from the flap side of the hub structure 20. Hence, the inner end of the yieldable arm is free to slide horizontally for the length of the slot 28 and to twist about the axis of bolt 30, but is restrained from travel in a plane parallel to that containing the axis of rotation A—A of the hub.

In operation, the initial setting of the flap 12 relative to the leading edge portion 11 of the blade 10 will normally be such that the blade is untwisted and its effective pitch decreased as the flap moves upwardly above a position in which its chord line is in alignment with that of the leading edge portion, thus to form airfoil sections having reflex trailing edges during autorotative descent, such being permitted by the yieldable mounting of the blade butt in the hub and the initial adjustment for coning or flexing provided by such yieldable mounting. With moderately heavy blades, the coning angle of the blades during operation of the propeller as a lifting propeller will be in the neighborhood of 3½ to 4 degrees for each blade and, with transition to autorotative descent, this angle will increase to as much as 6 degrees, this being dependent upon the specific design of the blades and the rate of descent required.

Assuming that the increase in coning available when the blades move up from the position C—C (Fig. 9) to which they are initially set to the position C'—C' which they take upon transition from a power-on to a power-off condition of flight is in the neighborhood of 2 degrees, this movement according to the invention is utilized to effect a substantially greater variation in the flap angle Y in order to decrease the effective pitch of the blade in the neighborhood of 5 to 6 degrees near the tip of the blades. The mechanism required to effect such decrease in pitch is relatively simple. As the increased lift of the blades consequent to the transition from power-on to power-off conditions of flight acts to raise the blades (increase the coning thereof) to a new position in which lift and centrifugal forces effective upon them are in equilibrium, the blades in assuming this new position flex about an axis E—E parallel to the rocking axis B—B. With such increased coning, an inward projection of the axis D—D of the hinge pin 13 is moved oppositely to the direction of coning, due to the axis D—D being in effect pivoted about the axis E—E, as diagrammatically illustrated in Fig. 8. The leading edge of the flap 12, being integral with the axis D—D, follows the latter to assume the position D'—D', with increase of coning of the blade. However, the trailing edge of the flap 12 is free to take a position dictated by other forces. If restraint is applied to the flap at any point lying behind the axis D—D and out of alignment with the axis E—E, it is apparent that variation of coning of the blade from its initial setting will produce movement of the flap relative to the leading edge portion 11 of the blade. Since the flap must move upward with increased coning of the blade, thereby to effect decrease in the pitch thereof with transition from power-on to power-off flight conditions, it follows that the point F, at which restraint is applied to the flap, should lie inboard from the axis E—E and that the degree of movement of the flap will be dependent upon the distance that the point F lies behind the axis D—D.

The value of the relative distances for offsetting the point F is simplified by considering the relative movement of the flap as being dictated by an angle Z which lies between the axis D—D and a line connecting the points F and G, the latter being the point of intersection of the axes E—E and D—D. When so considered, the change in angularity of the flap 12 with coning of the blade 10 is thus seen to be roughly dictated by the co-tangent Z times the variation in the coning angle in degrees. The value of the angle Z is of course predetermined by the specific design contemplated. In Fig. 6 the point of restraint F is the point of effective connection between the hanger end 26 of the yieldable arm and the bolt 30 carried by the hub extension 31, which is offset from the axis of rotation A—A and lies relatively behind the axis D—D and in-board from the axis E—E, its position being moreover dictated by the angle Z.

With the above described arrangement, it will be observed that a small increase in the coning angle of the blades, as results from the transition from power-on to power-off flight conditions, is effective to raise the flaps relative to the leading edge portions of the blades throughout a substantially greater angle. Due to the triangular plan form of the blades and the fact that the ratio between flap area and that of the blade proper is greater at the inner sections of the blades than at the outer sections, raising of the flaps is effective to produce a decrease in the effective pitch of the blades through untwisting thereof and increasing the camber of the inner blade sections relative to the outer sections thereof to a degree that the flaps become automatically operative in the event of engine failure to convert the propeller to an efficient autorotative blade system.

Just as the leading edge of the flap 12 follows movement of the hinge pin axis D—D to a position D'—D' with increase of coning, it also moves to a position D"—D" with decrease of coning. In this case, arm 24 acts to lower the flap with decrease in the coning angle of the blades thereby to increase the effective pitch of the blade through twisting thereof. Since in some instances excessive downward coning of the blades, as in landing, may conceivably lead to excessive angles on the flaps, stops 36 (Fig. 6) shown as carried by the leading edge of the flap to cooperate with the rearward edge of the leading edge portion 11 of the blade are provided to limit movement of the flap in lowering direction, although such stops may function also to limit excessive raising movement of the flap. At such times the stresses imposed by the blades are taken up by yielding of the arm 24, the normal tension of which is calculated to be sufficient only to operate the flap through the range required. The elongated slot 28 functions similarly to provide relief to the flap operating mechanism when for any reason oscillation of the blade within its plane of rotation occurs.

From the foregoing, it will be seen that the invention achieves in simple and practical form the objective of means including trailing edge flaps for the blades of a lifting propeller for automatically converting the propeller to an efficient autorotative blade system in the event of engine failure. It will be observed also that the invention provides for gradual movement of the flaps automatically to an autorotative position and thus overcomes the objections of prior arrangements and methods employed to obtain pitch variation of the blades which depended on abrupt transition from power-on to power-off conditions of flight without taking into account the direction of the relative airstream still effective on the system by reason of the inertia of its forward motion. Moreover, through the provision of yieldable means for varying the effective pitch of the blades with coning thereof, the yield point of which is greater than required to vary the pitch throughout a normal range but which when the blade movement is arrested by appropriate stops is then yieldable, sureness and safety of operation results and the possibility of distortion of the mechanism or parts thereof is removed.

As many changes could be made in carrying out the above construction without departing from the scope of the invention, it is intended that all matter contained in the above description or shown in the accompanying drawings shall be interpreted as illustrative and not in a limiting sense.

I claim:

1. In rotary wing aircraft, a sustaining rotor having symmetrically disposed and substantially rigidly interconnected blades mounted for free rocking action about an axis transverse to said rotor's axis of rotation, means for mounting said blades upon said hub to permit limited variation in coning thereof, and means for varying the effective pitch of said blades with coning thereof.

2. In rotary wing aircraft, a sustaining rotor having symmetrically disposed and substantially rigidly interconnected blades mounted for free rocking action about an axis transverse to said rotor's axis of rotation, means for mounting said blades upon said hub to permit limited variation in coning thereof, and means for varying the effective pitch of said blades with coning thereof including a triangular flap comprising the trailing edge of each of said blades whereby the effective pitch variation is greater on the inner sections than on the outer sections of said blades.

3. In rotary wing aircraft, a sustaining rotor having symmetrically disposed and substantially rigidly interconnected blades mounted for free rocking action about an axis transverse to said rotor's axis of rotation, means for mounting said blades upon said hub to permit limited variation in coning thereof, and means for varying the effective pitch of said blades with coning thereof, said last-named means including a trailing edge flap for the individual blades of said rotor the width of which is greater adjacent the inner sections of the blades than adjacent the outer sections of said blades.

4. In rotary wing aircraft, a sustaining rotor having symmetrically disposed and substantially rigidly interconnected blades mounted for free rocking action about an axis transverse to said rotor's axis of rotation, means for mounting said blades upon said hub to permit limited variation in coning thereof, and means for varying the effective pitch of said blades with coning thereof, said last-named means including a yield point in the mounting of each blade on said hub and a point of restraint integral with said hub structure and operatively contacting the butt of said blade, said points being so located that a line drawn between them makes an acute angle with the span axis of said blade.

5. In rotary wing aircraft, a sustaining rotor having symmetrically disposed and substantially rigidly interconnected blades mounted for free rocking action about an axis transverse to said rotor's axis of rotation, means for mounting said blades upon said hub to permit limited variation in coning thereof, and means for varying the effective pitch of said blades with coning thereof, said last-named means including a triangular flap mounted to form the trailing edge of each of said blades, a yield point in the mounting of said blades upon said hub structure, a substantially rigid arm extending inwardly of said yield point from each of said trailing edge flaps, and a rigid restraining arm mounted outboard of the main hub structure and operative to restrain movement of the end of said inwardly extending flap arm whereby the flap is raised in response to upward coning of the blades and depressed in response to downward coning of said blades.

RUSSELL R. HAYS.